United States Patent
Frantz et al.

(10) Patent No.: US 8,320,237 B2
(45) Date of Patent: Nov. 27, 2012

(54) OPTIMIZED BANDWIDTH ALLOCATION FOR GUARANTEED BANDWIDTH SERVICES

(75) Inventors: Michael Frantz, Munich (DE); Joao Filipe, Almere (NL); Stefan Klein, Munich (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 478 days.

(21) Appl. No.: 11/991,721

(22) PCT Filed: Aug. 21, 2006

(86) PCT No.: PCT/EP2006/008196
§ 371 (c)(1),
(2), (4) Date: Apr. 9, 2010

(87) PCT Pub. No.: WO2007/028494
PCT Pub. Date: Mar. 15, 2007

(65) Prior Publication Data
US 2010/0290336 A1    Nov. 18, 2010

(30) Foreign Application Priority Data
Sep. 7, 2005 (EP) ..................... 05019408

(51) Int. Cl.
*G01R 31/08* (2006.01)
*H04J 3/16* (2006.01)
(52) U.S. Cl. ....................... 370/228; 370/468
(58) Field of Classification Search ......... 370/216–228, 370/468
See application file for complete search history.

(56) References Cited

U.S. PATENT DOCUMENTS

| | | | |
|---|---|---|---|
| 7,130,264 B2 * | 10/2006 | Wiebe et al. | 370/225 |
| 7,512,147 B2 * | 3/2009 | Sato et al. | 370/452 |
| 2004/0193724 A1 | 9/2004 | Dziong et al. | |
| 2007/0291775 A1 * | 12/2007 | Frantz | 370/401 |

FOREIGN PATENT DOCUMENTS
EP    1638254 A1    3/2006

OTHER PUBLICATIONS

Michael Menth, A Performance Evaluation Framework for Network Admission Control Methods, 2004, IEEE.
Xin Wang, An Integrated Resource Negotiation, Pricing, and QoS Adaptation Framework for Multimedia Applications, IEEE Journal on Selected Areas in Communications, vol. 18, No. 12, Dec. 2000.

* cited by examiner

*Primary Examiner* — Kerri Rose
(74) *Attorney, Agent, or Firm* — Laurence A. Greenberg; Werner H. Stemer; Ralph E. Locher

(57) ABSTRACT

A method for minimizing bandwidth allocation for alternative routes within a network provides a management system for managing routes of services, provides a plurality of guaranteed bandwidth (GWB) services, assigns to each GBW-service a traffic class (TC), and calculates for each GBW-service of a protected TC an active route and an alternative route. The active route is a planned route in case of absence of a respective network failure and the alternative route is the route which guarantees that, in case of a network failure with respect to the active route, the GBW-service is protected. Further, a first optimized protection mode is provided to be assigned to all the GBW-services belonging to a given protected TC. The first optimized protection mode has a first optimization step including reserving bandwidth for each GBW-service only once for each network resource employed by the active and/or the alternative route of each GBW-service.

12 Claims, 5 Drawing Sheets

OPTIMIZED BANDWIDTH ALLOCATION FOR GUARANTEED BANDWIDTH SERVICES

CROSS-REFERENCE TO RELATED APPLICATIONS

The present application is a national stage application of International Application No. PCT/EP2006/008196, filed on Aug. 21, 2006, which claims priority to European Patent Application No. 05019408.3, filed on Sep. 7, 2005, both of which are incorporated herein by reference.

BACKGROUND OF THE INVENTION

The present invention relates to a process for optimized bandwidth allocation for guaranteed bandwidth services within telecommunications networks, in particular a method and a system for minimizing bandwidth allocation for alternative routes of guaranteed bandwidth services.

In recent years, the fast growing of telecommunications networks and the large amount of services over such networks have led to a remarkable growth of traffic. It is fundamental to provide to some of the services using a telecommunication network a certain level of service, for example by guaranteeing in advance predefined service transmission rates. A service hereby indicates an object in the network management system which is used to model a customer service. To each service it is assigned a certain traffic class (TC) which allows to group different services according to TCs. In order to cope with the need of guaranteeing in advance predefined service transmission rates, a service can be assigned to a guaranteed bandwidth TC so that the management system reserves bandwidth for the network resources used for the service.

In carrier grade Ethernet networks, as well as in SDH/SONET and ATM networks, a high service availability is required. High service availability is guaranteed when a network fulfils certain requirements. The first requirement is that the network capacity is managed in the management system in order to avoid overbooking for guaranteed bandwidth (GBW) services. The second requirement is that a service can be protected within the network. The service protection concept ensures that, even in case of a failure in one of the elements or links of the network, the service traffic is nonetheless transmitted. The term link refers to the physical or logical connection between two ports or network elements. The third requirement is that for each GBW-service, a bandwidth for that specific service can be assigned in the network. The forth requirement is that for each GBW-service, one or several dedicated routes can be assigned in the network: only one route is assigned, the so called active route, when the service is meant to be "unprotected" and several routes are assigned, one active route and N alternative routes, when the service is meant to be protected in case of single point of failure (SPOF) in the network. The number N of the alternative routes to be assigned depends on the topology of the network and on the number of SPOFs which can be protected.

According to widely used methods, in order to protect a GBW-service, the bandwidth for the active route as well as for each one of the alternative routes of the service is reserved in the management system. Unfortunately, in such methods, the reserved bandwidth grows linearly with the total number of routes of a service (linear bandwidth reservation approach). The active route of a service is hereby defined by the route via which the service traffic is transmitted in case there is no failure in the network. The active route basically corresponds to the initially planned route. The alternative routes of a service are the routes calculated taking into account the failure of a network resource used by the active route of the service. Such alternative routes ensure that the service traffic is transmitted through the network even in case of such network failure. The alternative routes are the so-called protecting routes of a service: the routes that guarantee that, in case of network of failure, a service can be protected elsewhere.

Widely known methods for calculating the service routes of an Ethernet network are based on algorithms belonging to the spanning tree protocol family (xSTP). Spanning tree protocol (STP), rapid spanning tree protocol and multiple spanning tree protocol (MSTP) are examples of widely used protocols belonging to the xSTP family.

In high service availability networks, the network management system ensures that the capacity of the network resources used for GBW-services is not overbooked. The routes are configured in the network by VLAN assignment of the ports, which are used for the active as well as for the alternative routes. Unfortunately, due to the fact that, in the linear bandwidth reservation approach, the bandwidth is reserved for all the routes, i.e. for the active as well as for each alternative route, a major drawback is that a large quantity of bandwidth is required for service protection and, as a consequence, transmission capacity is wasted.

At present, in order to guarantee that GBW-services are not overbooked, the user has to keep track about all the services already configured in the network and check if there is enough network capacity left so that a new GBW-service can be configured and added to the network. Depending by the approach used for reserving bandwidth for the protecting routes, the user has to calculate how much bandwidth to reserve to ensure service protection. This procedure has the drawback that high operative expenses are needed due to the complexity of the required calculations. An alternative widely used method, in order to avoid that GBW-services are overbooked, is to allocate enough network capacity by abundant provisioning of bandwidth in the network. However, this second method has the drawback that high capital expenses are needed due to the required investment for acquiring additional network resources.

SUMMARY OF THE INVENTION

It is therefore the aim of the present invention to overcome the above mentioned drawbacks, particularly by providing a method and a system for reducing to the minimum the network bandwidth allocation for the protected routes of GBW-services.

Within the scope of this aim, an object of the present invention is to provide a method and a system that enables automatic and fast calculations of the steps to be performed for the addition of a new GBW-service in the network. Another object of the present invention is to enable the user to choose among different levels of protection for GBW-services with minimum allocation of bandwidth resources. Another object is to warn the user if a new GBW-service to be added in the network is causing overbooking problems and to inform the user about which are the specific GBW-services affected by the overbooking.

This aim, these objects and other which will become better apparent hereinafter are achieved by a method and a system for minimizing bandwidth allocation for alternative routes within a network, comprising the steps of:

a) providing a management system for managing the routes of services within said network;

b) providing a plurality of guaranteed bandwidth services, hereafter referred as GBW-services;

c) assigning to each GBW-service a traffic class, hereafter referred as TC;

d) calculating for each GBW-service belonging to a protected TC an active route and at least one alternative route; the active route being the planned route in case of absence of a respective network failure and the alternative route being the route which guarantees that, in case of a network failure with respect to the active route, said GBW-service is protected elsewhere by protecting the respective network resources;

e) providing a first optimized protection mode to be assigned to all the GBW-services belonging to a given protected TC; said first optimized protection mode comprising a first optimization step including the step of reserving bandwidth for each GBW-service only once per service for each network resource employed by the active and/or the alternative route of that GBW-service.

The invention may further advantageously the step of providing a second optimized protection mode comprising a second optimization step including the step of reserving, for each network resource, the minimum required bandwidth for all active and alternative routes of all GBW-services employing the network resource such that all services are protected against single point of failures in the network including guaranteed protection bandwidth.

Conveniently, the invention may further comprise the step of:

e1) providing a protection mode, to be assigned to all the GBW-services belonging to a given protected TC; said protection mode comprising the step of configuring and reserving bandwidth for each network resource employed by the GBW-service active-route and comprising the step of configuring, without reserving bandwidth, the network resources employed by the GBW-service alternative-routes.

The method may preferably comprise the step of c2) assigning to a plurality of GBW-services a non-protected TC;

d2) calculating for each GBW-service belonging to non-protected TC the active routes only;

e2) providing a no-protection mode, to be assigned to all the GBW-services belonging to a given non-protected TC; said no-protection mode comprising the step of reserving bandwidth for each network resource employed by the GBW-services active routes.

Further advantageous embodiments of the present invention are given below (each alone or in any possible combination):

i) further comprising the step of choosing, by a user of said management system, to assign GBW-services belonging to a given TC to one of the modes selected out of the group consisting of: said first optimized protection mode, said second optimization mode, said protected mode and said no-protection mode;

ii) further comprising the steps of storing the reserved bandwidth for each link and the failed object (hereafter referred as FO) in the network management system;

iii) further comprising the step of storing for each route of a given GBW-service; wherein the FO for the active routes is marked with a known tag and storing a table comprising the pair, FO and list of GBW-services, for every link of the network;

This means that for each combination of link and FO the network management system stores a list of all GBW services whose actual route (active or alternative depending on the service and the STP configuration) uses that link when that FO actually failed. The table also includes a "null" FO (per link) (which is the known tag) which models the network status where all network resources work properly, such that for that pair of link and "null" FO the associated service list contains all GBW services where the active route uses the link.

iv) further comprising the steps of:

warning the user in configuring a new GBW-service when the reserved bandwidth of any link would exceed the maximum available bandwidth of said link and, by the user, selecting whether to cancel the configuration of that service or to configure the new GBW-service and mark as overbooked all the GBW-services using said link;

v) further calculating said routes with algorithms belonging to the spanning tree protocol family xSTP.

BRIEF DESCRIPTION OF THE SEVERAL VIEWS OF THE DRAWINGS

Further characteristics and advantages of the invention will become better apparent from the following description of preferred but not exclusive embodiments of the method and system for minimizing bandwidth allocation for alternative routes within a telecommunications network, illustrated by way of non-limitative embodiments in the accompanying drawings, wherein.

DETAILED DESCRIPTION OF THE INVENTION

Figure 1:
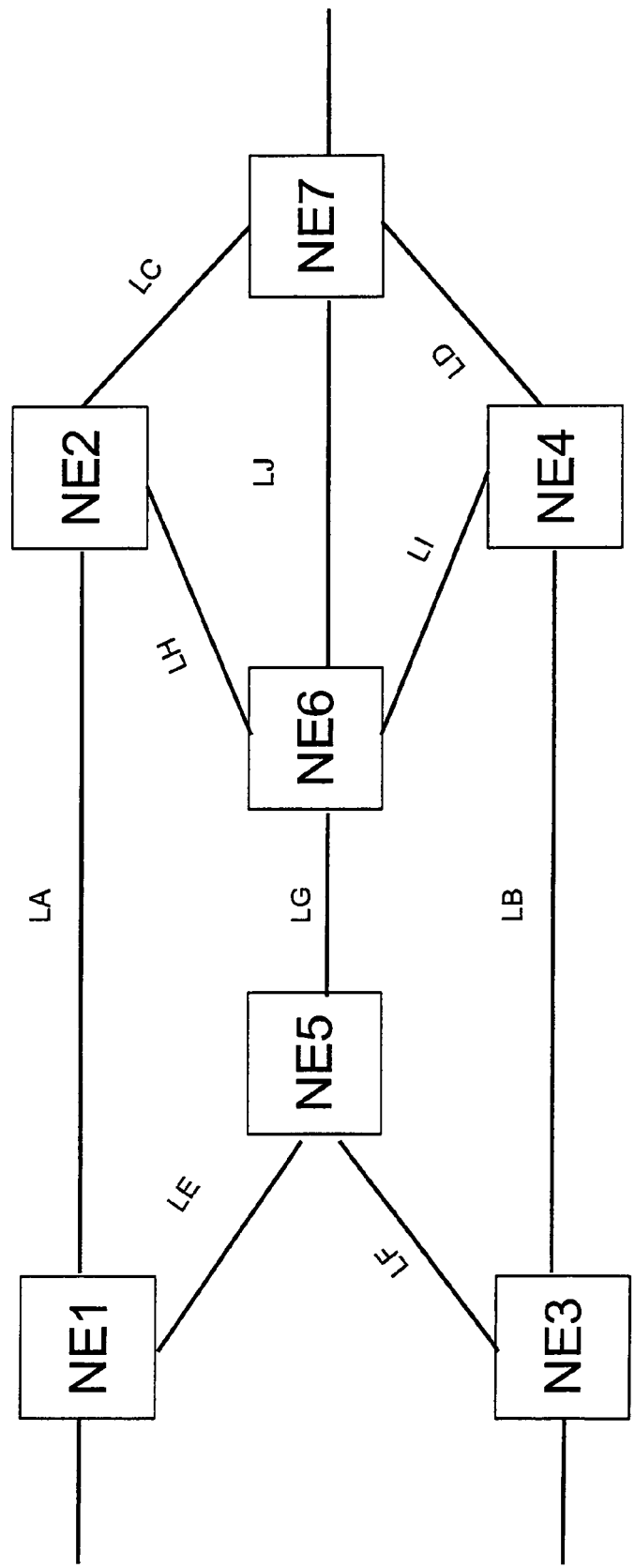
FIG. 1 is a block diagram of an example of network topology.
Figure 2:
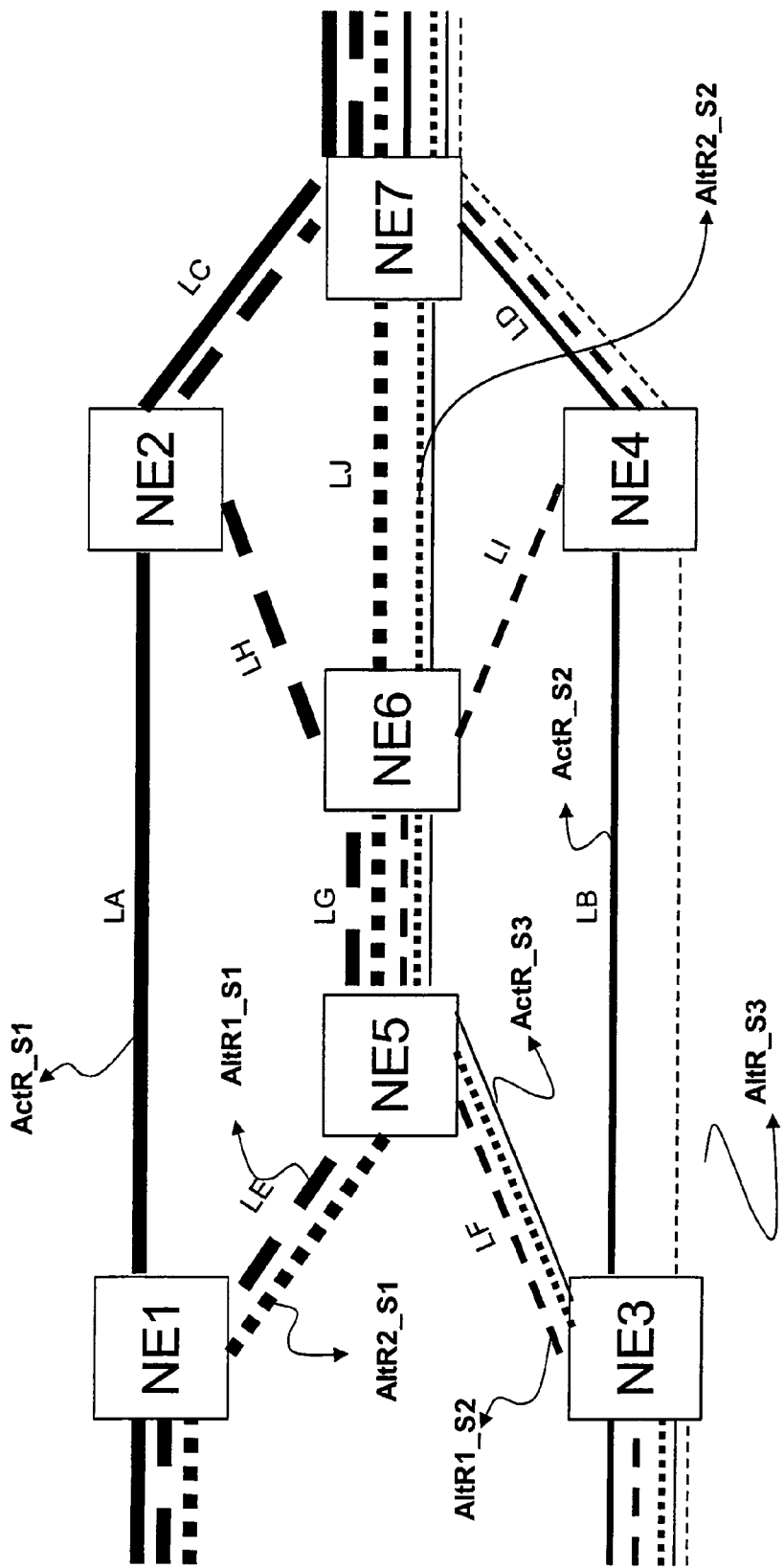
FIG. 2 is a block diagram showing protected service routes for the network topology of FIG. 1.
Figure 3:
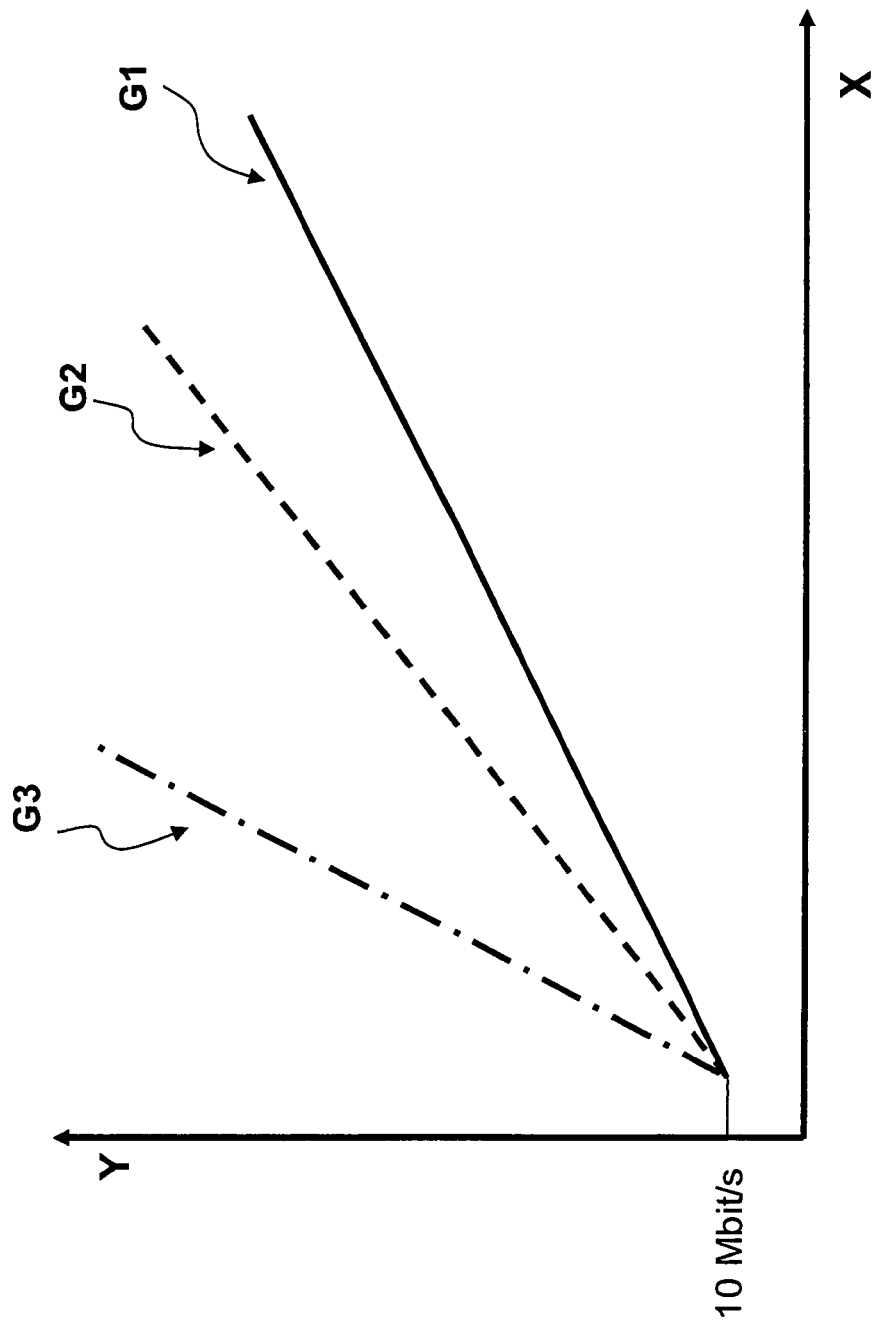
FIG. 3 is a graph illustrating bandwidth usage.

FIGS. 1 to 3 show the problem of the large amount of bandwidth reserved for GBW-service protection using the linear reservation approach. In FIG. 1, an example of a meshed network topology with seven network elements NE1, NE2 to NE7 and ten links LA, LB to LJ is shown.

In FIG. 2, three protected services S1, S2 and S3 with the same GBW and belonging to the same TC are configured in the network having the topology of FIG. 1. Every protected service has one active route and a number of alternative routes depending on the number of SPOFs that can be protected. The active route of service S1 is the route ActR_S1 and it employs the network elements NE1, NE2 and NE7 and the links LA and LC. The active route of service S2 is ActR_S2 and it employs the network elements NE3, NE4 and NE7 and the links LB and LD. The active route of service S3 is ActR_S3 and it employs the network elements NE3, NE5, NE6 and NE7 and the links LF, LG and LJ.

The alternative route of service S1 in case of SPOF of link LA is the route AltR1_S1. The alternative route of service S1 in case of failure of link LA is the route AltR1_S1. The alternative routes of service S1 in case of failure of the network element NE2 or of link LC are routes AltR2_S1, these routes are two alternative routes, one for each SPOF.

The alternative route of service S2 in case of failure of link LB is route AltR1_S2. The alternative routes of service S2 in case of failure of the network element NE4 or of link LD are routes AltR2_S2, these routes are two alternative routes, one for each SPOF. The alternative routes of service S3 in case of failure of network element NE5, NE6 and link LG are routes AltR_S3, these routes are two alternative routes, one for each SPOF.

Several alternative routes (AltR1_S1, AltR2_S1, AltR1_S2, AltR2_S2, AltR_S3) are present because there are several possible SPOFs which require different alternative routes for each of the protected services (S1, S2 and S3). In the linear reservation approach, the bandwidth, which is configured for each service, is reserved for each active and alternative route. It is noted that in the scenario shown in FIG. 2 there are not alternative routes possible for all SPOFs.

Table 1 shows the reserved bandwidths in the management system for each different link LA, . . . , LJ with the linear bandwidth reservation approach. The guaranteed bandwidth for each service S1, S2 and S3 is assumed to be 10 Mbits/s in each direction. The respective sum is calculated over all possible single failures. For this reason, each alternative route counts per SPOF.

TABLE 1

| Link | LA | LB | LC | LD | LE | LF | LG | LH | LI | LJ |
|---|---|---|---|---|---|---|---|---|---|---|
| Reserved BW per Link in Mbit/s | 10 | 30 | 20 | 40 | 30 | 40 | 70 | 10 | 10 | 50 |

It should be noted that the lines shown in FIG. 2 as well as the data in Table 1 and 2 may represent multiple (topologically identical) alternative routes, i.e. one per SPOF.

For example, the reserved bandwidth in link LD is 40 Mbps since, as shown in FIG. 2, three routes are configured in the link LD: the active route of service S2, AtcR_S2, one alternative route for service S2, AltR2_S2, and one alternative route for service S3, AltR_S3. The required bandwidth in the network for protected services S1, S2 and S3 is indicated by the maximum reserved bandwidth in each of the links LA, . . . , LJ. In the example shown in FIG. 2, the required bandwidth of the network is 70 Mbits/s, i.e. the reserved bandwidth of link LG. Even in the simple meshed topology example of FIG. 2, the required bandwidth of the network is seven times the guaranteed bandwidth of one protected service.

In addition, it is obvious that the complexity of the network, i.e. the number of links used for each protected service and the grade of how meshed the network topology is, has also an impact on the required bandwidth of the network. The more the network is meshed, the more bandwidth is required in the network.

FIG. 3 shows a graph in which the required bandwidth Y, calculated using the linear bandwidth reservation approach, is plotted in function of the number of protected services X, assuming that all services require the same amount of guaranteed bandwidth. It has to be noted that FIG. 3 shows the relationship between the three approaches qualitatively and the dependency of Y on X may not be mathematically linear, since the quantitative relation between X and Y depends strongly on the network. The intention of the figure is to visualize that the "second optimized protection" saves bandwidth compared to the "first optimized protection" which in turn saves bandwidth compared to "linear bandwidth reservation".

Graphs G2 and G3 show how the required bandwidth grows in dependence of the network complexity. Graph G1 plots the required bandwidth for the active routes as a function of the number of protected services X. Graph G2 plots the required bandwidth in a middle meshed network when not all possible network failures can be protected. Graph G3 plots the required bandwidth in a highly meshed network when most network failures can be protected. Graph G3 presents a greater slope than graph G2. The more the network failures to be protected, i.e. the higher the network is meshed, the more bandwidth is required with the linear reservation approach.

With the present invention, the user has the possibility to define the bandwidth reservation mode for the protection of all GBW-services belonging to a given TC. The user can choose, in the management system, among four different protection modes for the bandwidth reservation for GBW-services of a given TC. The protection mode can be set in the management system only once and can be set only for each TC, not for each single GBW-service. If MPOF are rare in the network, then a protection against SPOF including bandwidth guarantee can be seriously considered to be sufficient in order to allow the proper functionality of the network. This circumstance can be, for instance, applied to a network where the present invention will be deployed.

The first protection mode is the non-protected mode. In this mode, no alternative route is calculated for the network failures of the services so that in case of failure of any network resource used by a service no service traffic is transmitted. The VLAN is configured for the active route only.

The second protection mode provides protection without bandwidth reservation for the protected network resources. In this mode, the VLAN is configured for the active and alternative routes but no bandwidth is reserved for the alternative routes. Thus, bandwidth is reserved for the active routes only. In this mode, the user must be aware of the fact that, in case of network failure, service traffic can be lost if network capacity is full.

The third protection mode provides protection with bandwidth reservation and a first optimization step is performed. In this mode, the bandwidth is reserved for the active route and for all the alternative routes as well. In this mode, the bandwidth reservation is optimized per service with respect to the linear reservation approach. In fact, bandwidth is reserved for each GBW-service only once for each network resource used by at least one route (active or alternative) of the service. This mode is extensively described in the first optimization step.

The forth protection mode provides network wide optimized bandwidth reservation for the protecting network resources and a second optimization step is performed. In this mode, the bandwidth reservation is reduced to the minimum possible value required to protect GBW-services in case of one network failure.

This optimization is achieved by performing the two optimization steps hereinafter described. In the first optimization step, bandwidth is reserved for the network resources of the routes of one GBW-service only once. The underlying assumption is that, independently from the type of network failure, the bandwidth on any route is required only once for each GBW-service, since it is not possible that the active or the alternative routes of a GBW-service require the bandwidth at the same point of time. In the first sub-step of the first optimization step, the management system calculates, for each GBW-service, the active and the alternative route, if possible, for each network failure. In the network topology of the example of FIG. 1, for services S1, S2 and S3, the management system calculates the routes shown in FIG. 2. In the second sub-step of the first optimization step, the management system reserves only once the bandwidth for each network resource used by one or more routes of the same service.

Figure 4:
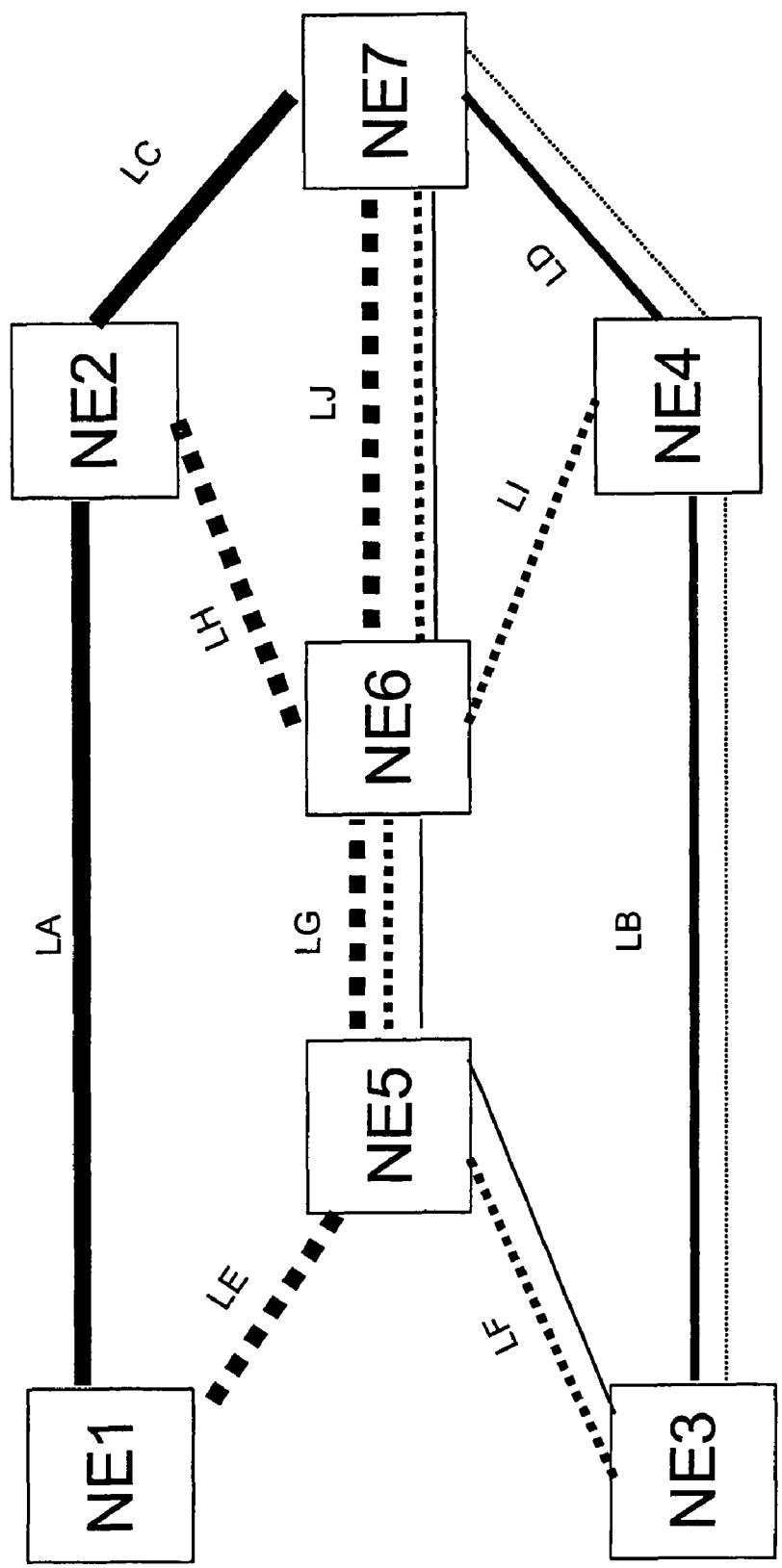
FIG. 4 is a block diagram showing reduced bandwidth allocation after the first optimization step of the present invention.

FIG. 4 shows, for each link, the bandwidth reserved after the first optimization step for every GBW-service. Every line of the links represents reserved bandwidth of 10 Mbits/s. In FIG. 4, the continuous lines represent the bandwidth reserved for the active routes and for the alternative routes that belong to the same GBW-service and the dashed lines represent the reserved extra bandwidth for the other alternative routes of the GBW-service. Moreover, in FIG. 4, the thickness of the continuous and dotted lines is different for each of the GBW-services: the thick lines are used for the reserved bandwidth of service S1, the medium-thick lines for the reserved bandwidth of service S2 and the thin line for the reserved bandwidth of service S3.

As an example, in link LF of FIG. 4, the bandwidth is reserved only once for service S2 (the medium-thick dashed line) and only once for service S3 (the thin continuous line) so that the total bandwidth reserved in link LF is 30 Mbps. Instead, in the example of FIG. 2 in which the optimization step has not been performed, the reserved bandwidth in link LF is 40 Mbp/s (twice for service S2 and once for service S3).

TABLE 2

| Link | LA | LB | LC | LD | LE | LF | LG | LH | LI | LJ |
|---|---|---|---|---|---|---|---|---|---|---|
| Reserved BW per Link in Mbit/s in the linear approach | 10 | 30 | 20 | 40 | 30 | 40 | 70 | 10 | 10 | 50 |
| Reserved BW per Link in Mbit/s after the 1$^{st}$ optimization step | 10 | 20 | 10 | 20 | 10 | 20 | 30 | 10 | 10 | 30 |

The second row of Table 2 shows the bandwidth reserved for services S1, S2 and S3 after the first optimization step. As seen by comparing the numerical values of the two rows of Table 2, with the first optimization step in some links there are bandwidth savings with respect to the linear bandwidth reservation approach. As above defined, the required bandwidth in the network for protected services S1, S2 and S3 is indicated by the maximum reserved bandwidth for the links LA, ..., LJ. In the example of FIG. 4, the required bandwidth of the network is 30 Mbits/s, i.e. the reserved bandwidth of link LG. Therefore, in this case, if the user selects the third protection mode, 20 Mbits/s are already saved in link LG compared to the reserved bandwidth with the linear reservation approach.

In the second optimization step, the management system calculates the maximum required bandwidth to be reserved for one SPOF in the network. The second optimization step is based on two assumptions. The first assumption is that the algorithm which calculates the alternative routes considers only single points of failure (SPOFs). Even if it is possible, that due to the multiple alternative routes, a service can be protected against multiple points of failure (MPOFs), the algorithm does not guarantee protection over this possibility.

Figure 5:
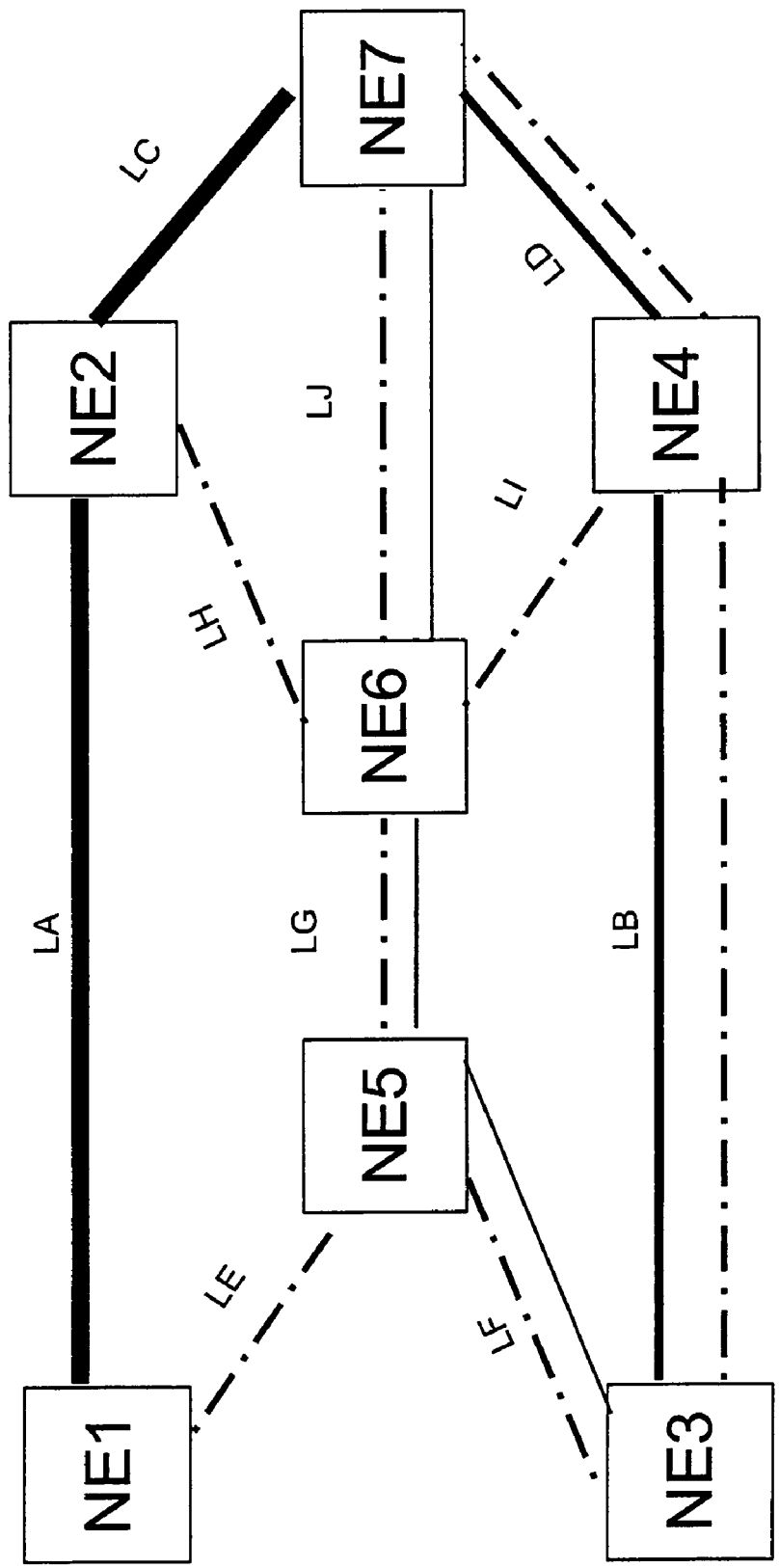
FIG. 5 is a block diagram showing reduced bandwidth allocation after the second optimization step of the present invention.

Table 3 shows the bandwidth reduction obtained after the second optimization step for the same example of FIG. 5.

As shown in Table 3, after the second optimization step, the reserved bandwidth for links LG and LJ is reduced again as compared to the first optimization step. The bandwidth reduction achieved with the second optimization step improves in case of a higher number of protected services and in case of a more complex network topology. In one embodiment of the present invention, the management system keeps the failed object (FO) for every route of the path of every service (null for the active route). Every alternative route of a service is calculated by simulating one failure on each object of the active route.

TABLE 3

| Link | LA | LB | LC | LD | LE | LF | LG | LH | LI | LJ |
|---|---|---|---|---|---|---|---|---|---|---|
| Reserved BW per Link in Mbit/s in the linear approach | 10 | 30 | 20 | 40 | 30 | 40 | 70 | 10 | 10 | 50 |
| Reserved BW per Link in Mbit/s after the 1$^{st}$ optimization step | 10 | 20 | 10 | 20 | 10 | 20 | 30 | 10 | 10 | 30 |
| Reserved BW per Link in Mbit/s after the 2$^{nd}$ optimization step | 10 | 20 | 10 | 20 | 10 | 20 | 20 | 10 | 10 | 20 |

Advantageously, the management system keeps a table with the pairs, failed object (FO) and list of GBW-services, for every link of the network. With this information, the management system is able to know, for every link and every SPOF in the network, which are the GBW-services using the link.

The calculation of the above management system (MS)-table can be done incrementally when any GBW-service with is created. For each link (L), the list of GBW-services associated with a certain FO contains all GBW-services whose active route contains FO and all GBW-services whose active route contains L but does not contains FO. The person skilled in the art could easily define the procedures for the updating of the MS table when GBW-services are deleted or modified when proceeding with a straight forward extension of the network management system, as all steps and algorithms specified in the invention are provided to be implemented in the software of a network management system. The MS-table contains, for each link, all GBW-services using the link if there is no failure and all GBW-services using the link for each FO per link.

Table 4 shows, for the example of FIG. 5, the saved pairs for link LG in the MS-table.

In another embodiment of the present invention, only the bandwidth for each link and FO are stored in the MS-table. However, the additional information stored with the former embodiment can be useful to the user, e.g. this information can provide the list of GBW-services using a given link or the bandwidth usage for a link.

Table 5 now shows the exemplary algorithm used in the management system to calculate the bandwidth "Bandwidth (L)" to be reserved per any link L, where L.table.failObjects refers to table 4.

Advantageously, when a new GBW-service is created and the bandwidth of any link exceeds the maximum bandwidth of the link, the system raises a warning and asks the user whether the new service is to be configured in the network or not. In case the user decides to configure the service, the management system marks as overbooked each of the service affected. In the shown embodiment, all routes are modelled unidirectional in order to handle different bandwidth reservation per direction. For the unidirectional modelling of the capacity management, the bandwidth is reserved per port at the egress direction. For the person skilled in the art, it is a straight forward reasoning to extend the optimization steps for the multi-directional model.

In case the routes are calculated with the Multiple Spanning Tree Protocol (MSTP), the optimization steps are applied to each spanning tree instance. The proposed invention can be also applied to the routes calculated with STP and RSTP algorithms.

The above described optimization steps can be extended to the case of MPOFs in the network as well as to the case MPOFs for one service.

TABLE 4

| Link | FO | GBW-service list of TCx | GBW-service list of TCy | GBW-service list of TCz | ... |
|---|---|---|---|---|---|
| ... | ... | ... | ... | ... | ... |
| LG | Null | S3 | ... | ... | ... |
|  | LA | S1, S3 |  |  |  |
|  | LB | S2, S3 |  |  |  |
|  | LC | S1, S3 |  |  |  |
|  | LD | S2, S3 |  |  |  |
|  | NE2 | S1, S3 |  |  |  |
|  | NE4 | S2, S3 |  |  |  |
| ... | ... | ... | ... | ... | ... |

TABLE 5

```
Bandwith(L) =0
ForEach FO From L.table.failObjects
    BW_FO=sum CIR over GBW-service list of (L,FO)
    Bandwidth(L)= max(Bandwidth(L), BW_FO)
Where
L=link
CIR=committed information rate
FO=failed object
```

The proposed invention is advantageously enabling the user to choose the protection mode of GBW-services among four different protection so as to define the amount of bandwidth to be reserved. Moreover, the user can define the protection quality by deciding whether a given TC of GBW-services can be protected in case of SPOF or MPOF in the network. Advantageously, with the present invention, since bandwidth losses of the linear bandwidth reservation approach are avoided transmission capacity is saved. Conveniently, the data stored in the MS-table provides the user with information about which are/is the failed link/s, what is the failed object (if any) causing problems and which are the GBW-services of a given TC already using the link.

Moreover, the incremental nature of the algorithm render the computational time short and the calculation of the reserved bandwidth per link is the optimal value in case of any single failure in the network. If the capacity of any link is exceeded, it is prevented or warned only the creation of new GBW-services using that link but not the creation of other GBW-services using other links.

The invention claimed is:

1. A method for minimizing bandwidth allocation for alternative routes within a telecommunication network, comprising the steps of:

providing a management system for managing routes of services within said network;
providing a plurality of guaranteed bandwidth services, hereafter referred as GBW-services;
assigning to each GBW-service a traffic class, hereafter referred as TC;
calculating for each GBW-service belonging to a protected TC an active route and at least one alternative route, the active route being a planned route in case of absence of a respective network failure and the alternative route being the route which guarantees that, in case of a network failure with respect to the active route, said GBW-service is protected elsewhere by protecting the respective network resources;
providing a first optimized protection mode to be assigned to all the GBW-services belonging to a given protected TC, the first optimized protection mode including a first optimization step including the step of reserving bandwidth for each GBW-service only once for each network resource employed by the active and/or the alternative route of each GBW-service;
providing a second optimized protection mode including a second optimization step including the step of reserving, for each network resource, an absolute minimum bandwidth to ensure protection and bandwidth guarantee for all GBW-services for any single network failure; and
providing a protection mode, to be assigned to all the GBW-services belonging to a given protected TC, said protection mode including the step of reserving bandwidth for each network resource employed by the GBW-service active-route and the step of configuring, without reserving bandwidth, the network resources employed by the GBW-service alternative-routes.

2. The method of claim 1,
further comprising the steps of:
assigning to a plurality of GBW-services a non-protected TC;
calculating and configuring for each GBW-service belonging to non-protected TC the active routes only; and
providing a no-protection mode, to be assigned to all the GBW-services belonging to a given non-protected TC, said no-protection mode comprising the step of reserving bandwidth for each network resource employed by the GBW-services active routes.

3. A method for minimizing bandwidth allocation for alternative routes within a telecommunication network, comprising the steps of:

providing a management system for managing routes of services within said network;
providing a plurality of guaranteed bandwidth services, hereafter referred as GBW-services;
assigning to each GBW-service a traffic class, hereafter referred as TC;
calculating for each GBW-service belonging to a protected TC an active route and at least one alternative route, the active route being a planned route in case of absence of a respective network failure and the alternative route being the route which guarantees that, in case of a network failure with respect to the active route, said GBW-service is protected elsewhere by protecting the respective network resources;
providing a first optimized protection mode to be assigned to all the GBW-services belonging to a given protected TC, said first optimized protection mode comprising a first optimization step including the step of reserving bandwidth for each GBW-service only once for each network resource employed by the active and/or the alternative route of each GBW-service; and
choosing, by a user of said management system, to assign GBW-services belonging to a given TC to a mode selected from the group consisting of: said first optimized protection mode, a second optimization mode, a protected mode and a no-protection mode.

4. The method of claim 3, further comprising the steps of storing the reserved bandwidth for each link and the failed object in the network resources, hereafter referred as FO.

5. The method of claim 4, further comprising the steps of:
by said management system, storing for each route a given GBW-service; wherein the FO for the active routes is marked with a known tag;
by said management system, storing a table comprising the FO and a list of GBW-services, for every link of the network.

6. A method for minimizing bandwidth allocation for alternative routes within a telecommunication network, comprising the steps of:
providing a management system for managing routes of services within said network;
providing a plurality of guaranteed bandwidth services, hereafter referred as GBW-services;
assigning to each GBW-service a traffic class, hereafter referred as TC;
calculating for each GBW-service belonging to a protected TC an active route and at least one alternative route, the active route being a planned route in case of absence of a respective network failure and the alternative route being the route which guarantees that, in case of a network failure with respect to the active route, said GBW-service is protected elsewhere by protecting the respective network resources;
providing a first optimized protection mode to be assigned to all the GBW-services belonging to a given protected TC, said first optimized protection mode comprising a first optimization step including the step of reserving bandwidth for each GBW-service only once for each network resource employed by the active and/or the alternative route of each GBW-service;
by the management system, warning the user in configuring a new GBW-service when the reserved bandwidth of any link would exceed the maximum available bandwidth of said link; and
by the user, selecting whether or not to configure the new GBW-service or configure the new GBW-service and mark as overbooked all the GBW-services using said link.

7. The method of claim 6, wherein said network failure is a single point of failure.

8. A method for minimizing bandwidth allocation for alternative routes within a telecommunication network, comprising the steps of:
providing a management system for managing routes of services within said network;
providing a plurality of guaranteed bandwidth services, hereafter referred as GBW-services;
assigning to each GBW-service a traffic class, hereafter referred as TC;
calculating for each GBW-service belonging to a protected TC an active route and at least one alternative route, the active route being a planned route in case of absence of a respective network failure and the alternative route being the route which guarantees that, in case of a network failure with respect to the active route, said GBW-service is protected elsewhere by protecting the respective network resources;
providing a first optimized protection mode to be assigned to all the GBW-services belonging to a given protected TC, said first optimized protection mode comprising a first optimization step including the step of reserving bandwidth for each GBW-service only once for each network resource employed by the active and/or the alternative route of each GBW-service; and
said network failure is a multiple point of failure.

9. The method of claim 6, wherein said routes are calculated with algorithms belonging to the spanning tree protocol family xSTP.

10. A system for minimizing bandwidth allocation for alternative routes within a network, comprising:
a plurality of guaranteed bandwidth services, hereafter referred as GBW-services;
a management system configured by software to:
manage routes of services within said network;
assign to each GBW-service a traffic class, hereafter referred as TC;
calculate each GBW-service belonging to a protected TC an active-route and at least one alternative-route, the active-route being a planned route in case of no network failure and the alternative-route being the route which guarantees that, in case of a network failure, said GBW-service is protected elsewhere through protecting network resources;
provide a first optimized protection mode to be assigned to all the GBW-services belonging to a given protected TC, said first optimized protection mode performing a first optimization step including reserving bandwidth for each GBW-service only once for each network resource employed by any route of each GBW-service; and
provide a protection mode, to be assigned to all the GBW-services belonging to a given protected TC, said protection mode reserving bandwidth for each network resource employed by the GBW-service active-route and configuring, without reserving, the bandwidth for each protected network resource employed by the GBW-service alternative-routes.

11. The system of claim 10, wherein the management system is additionally configured to provide a second optimized protection mode including a second optimization step reserving, for each network resource, the minimum required bandwidth for all GBW-service routes employing said network resource.

12. The system of claim 10, wherein the management system is additionally configured to:
assign to a plurality of GBW-services a non-protected TC;
calculate for each GBW-service belonging to non-protected TC the active routes only; and
provide a no-protection mode, to be assigned to all the GBW-services belonging to a given non-protected TC, said no-protection mode reserving bandwidth for each network resource employed by the GBW-services active routes.

* * * * *